United States Patent [19]

Mizuno et al.

[11] 4,272,292
[45] Jun. 9, 1981

[54] HEAT TRANSFER PRINTING

[75] Inventors: Shogo Mizuno, Toride; Kyoichi Shimomura, Tokyo; Michiaki Kobayashi, Tokyo, all of Japan

[73] Assignee: Dai Nippon Insatsu Kabushiki Kaisha, Tokyo, Japan

[21] Appl. No.: 962,901

[22] Filed: Nov. 22, 1978

[30] Foreign Application Priority Data

Nov. 28, 1977 [JP] Japan .................... 52-142423
Nov. 28, 1977 [JP] Japan .................... 52-142424

[51] Int. Cl.³ .............. C09D 11/02; C09D 11/10; C09D 11/14; D06P 5/15
[52] U.S. Cl. ............................ 106/22; 8/471; 106/23; 106/26; 106/31; 427/146; 428/207; 428/211; 428/913; 428/914; 430/201
[58] Field of Search ............. 8/2.5 R, 2.5 A, 176, 8/471; 106/22, 23, 26, 31; 156/234, 240, 277; 427/43, 44, 54, 56, 148, 43.1, 54.1, 56.1, 146; 428/200, 207, 211, 219, 411, 537, 913, 914; 260/37 P; 430/200, 201

[56] References Cited

U.S. PATENT DOCUMENTS 3,969,071  7/1976  Hugelin .................... 8/2.5 R
4,040,779  8/1977  Loew et al. ............... 8/2.5 R

FOREIGN PATENT DOCUMENTS 49-12916  1/1974  Japan .
49-12917  12/1974  Japan .
50-14889  7/1975  Japan .
50-18784  7/1975  Japan .

Primary Examiner—Bruce H. Hess
Attorney, Agent, or Firm—Kenyon & Kenyon

[57] ABSTRACT

An ink composition for heat transfer printing comprising at least one of carbinol bases of basic dyes or their derivatives, a strong base, a binder and a solvent for dissolving the binder. This ink composition is excellent in storage stability because it contains a carbinol base of a basic dye or its derivative in isolated form as a coloring agent along with a strong base. By using this ink composition, a transfer sheet having high storage stability can be obtained.

9 Claims, 3 Drawing Figures

HEAT TRANSFER PRINTING

BACKGROUND OF THE INVENTION

This invention relates to an ink composition having high storage stability for use in heat transfer printing of fiber products including textiles and fabrics, particularly those of acid-modified synthetic fibers.

Heretofore, a process for heat transfer printing acid-modified synthetic fiber products, such as acrylic fiber and polyester fiber products dyeable with cationic dyes, with basic dyes (cationic dyes) has been widely known as the heat transfer or sublimation transfer process.

Since this process resorts largely to the heat transferability of dyes (which is due mainly to sublimation, but may also be caused by melting and evaporation in some cases), various processes for increasing the heat transferability of the basic dyes have been proposed. One of such processes is a process wherein a basic dye is used with a base thereby to increase the sublimability of the dye (For instance, Japanese Patent Laid-Open No. 12916/1974 and No. 12917/1974), and another example of proposed processes is a process wherein a basic dye is converted to a carbinol base thereof or its derivative and then is used as a dye for transfer printing (for instance, Japanese Patent Laid-Open No. 18784/1975 and No. 14889/1975).

Dyes with increased heat transferability obtained in the above described manner are advantageous from the viewpoint of heat transfer printing procedures, but are very disadvantageous when ink compositions containing such dyes and transfer sheets obtained by using the same are stored because their storage stability is reduced by the increased heat transferability of the dyes.

For example, in the case of such an ink composition, the dye contained therein will deteriorate or decompose during storage, and a transfer sheet or a transferred pattern obtained by using an ink composition stored for 1 or 2 months after preparation will be reduced in concentration and changed in hue in comparison with that obtained by using the same ink composition freshly prepared. These tendencies are particularly notable in some dyes.

The aforementioned defects in the conventional ink compositions for heat transfer printing have been considered to be due to the instability of carbinol bases or their derivatives which are easily transferable dyes (see, for example, Japanese Patent Laid-Open No. 86691/1974 and "Dyeing Industry",24(4), pp. 33–46).

Since transfer printers are not ordinarily the same as transfer sheet or transfer printing ink makers, reduction in storage stability decreases the commercial value of transfer sheets or inks for transfer printing to a great extent.

SUMMARY OF THE INVENTION

It is an object of the present invention to provide an ink composition for heat transfer printing which retains the heat transferability of the dye and also possesses high storage stability.

It is another object of the present invention to provide a transfer sheet retaining both the heat transferability of the dye and storage stability, and a heat transfer printing process using the same.

As a result of researches, we have found that these objects can be achieved by causing carbinol bases of basic dyes or their derivatives to coexist with strong bases in an ink or a coloring layer of a transfer sheet.

The ink composition for heat transfer printing according to the present invention comprises at least one of carbinol bases of basic dyes or their derivatives, a strong base, a binder and a solvent for dissolving the binder.

The transfer sheet according to the present invention comprises a substrate sheet and, provided thereon, a coloring layer of a desired pattern containing a coloring agent comprising at least one of carbinol bases of basic dyes or their derivatives, a strong base and a binder.

Further, the heat transfer printing process in accordance with this invention comprises superposing the above described transfer sheet on a transfer receiving base material (fiber product to be transfer printed) consisting of a fiber dyeable with cationic dyes so that the surface provided with the coloring layer of the former contacts the surface of the latter, and maintaining the superposed sheet and material under heat and pressure.

In the light of the teaching of Japanese Patent Laid-Open No. 12916/1974 and other references cited earlier that a base is an additive which serves to convert a stable basic dye to an unstable and heat transferable carbinol base thereof, our finding mentioned hereinabove may appear unexpected.

Although it is not sufficiently clear why a carbinol base is rendered stable when a strong base is added thereto, one reason for this may be that the carbinol base per se is not unstable but rather an intermediate between the carbinol base and a basic dye is unstable.

Namely, the following equilibrium is known to exist between a salt of a basic dye and a carbinol base thereof:

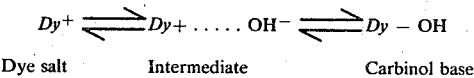

| Dye salt | Intermediate | Carbinol base | wherein Dy is a cationic moiety of a basic dye.

If a carbinol base alone is present in an ink composition, an intermediate as shown above may be formed by the action of trace amounts of acids in the air such as $CO_2$, and the intermediate thus formed, being unstable, may result in deterioration of a dye component in the ink composition.

Further, in the case where NaOH, for example, is used as a base in the basic dye-base system as disclosed in Japanese Patent Laid-Open No. 12916/1974, a salt NaX which is formed through the following equilibrium:

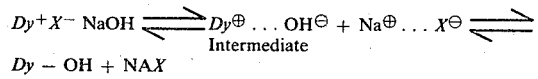

$Dy - OH + NAX$ wherein $X^-$ is an acid radical, and remains in the system is considered to shift the equilibrium leftwards, thus contributing particularly to formation of an unstable intermediate.

It will be understood from the above hypothesis that prevention of a shift of the equilibrium, i.e., formation of an intermediate, by removing the unnecessary and deleterious acid residue from the system and further adding a strong base ensures stability of the ink composition.

Since the heat transferability of a dye is due to its nonionic nature rather than to its ionic nature, it will be understood that prevention of formation of an unstable intermediate thereby to retain a stable carbinol base does not adversely affect the heat transferability of the dye per se.

As set forth hereinabove, the present invention is based on the discovery that the sublimability of a dye does not always correlate with the stability thereof.

The nature, utility, and further features of this invention will be apparent from the following detailed description beginning with a consideration of the general aspects of the invention and concluding with specific examples of practice illustrating preferred embodiments of the invention.

Throughout the accompanying drawings like parts are designated by like reference numerals.

DETAILED DESCRIPTION OF THE INVENTION

Figure 1:
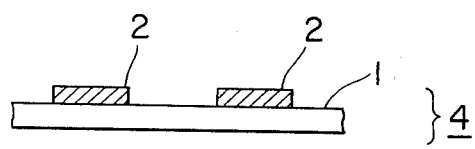
FIGS. 1 and 2 are sectional views respectively of examples of the transfer sheet according to the present invention.

The present invention will now be described in greater detail.

For the carbinol bases of basic dyes or their derivatives according to this invention, any of those having sublimability at a transfer temperature of from 80° to 250° C. can be used.

For example, the carbinol bases of the basic dyes listed below and their derivatives are suitable.

Methine basic dyes such as Aizen Cathilon Yellow 3GLH (C.I. Basic Yellow 11 manufactured by Hodogaya Kagaku K.K.), Aizen Cathilon Yellow GLH (C.I. Basic Yellow 14, Hodogaya Kagaku K.K.), Astrazon Yellow GRL (C.I. Basic Yellow 29, Beyer A.G.), Diacryl Yellow 3GN (C.I. Basic Yellow 51, Mitsubishi Kasei K.K.), Diacryl Brilliant Yellow 2G-N (C.I. Basic Yellow 33, Mitsubishi Kasei K.K.), Diacryl Golden Yellow GL-N (C.I. Basic Yellow 28, Mitsubishi Kasei K.K.), Aizen Cathilon Yellow GPLH (C.I. Basic Yellow 48, Hodogaya Kagaku K.K.), Astrazon Orange G (C.I. Basic Orange 21, Beyer A. G.), Aizen Astra Phloxine FF (C.I. Basic Red 12, Hodogaya Kagaku K.K.), Aizen Cathilon Pink FGH (C.I. Basic Red 13, Hodogaya Kagaku K.K.), Sumiacryl Red 10B (C.I. Basic Red 15, Sumitomo Kagaku Kōgyō K.K.), Diacryl Pink R-N (C.I. Basic Red 35, Mitsubishi Kasei K.K.), Basacryl Brilliant Red G (C.I. Basic Red 52, Badische A. G.), Diacryl Brilliant Red 3G-N (C.I. Basic Red 68, Mitsubishi Kasei K.K.), Aizen Cathilon Red 6BH (C.I. Basic Violet 7, Hodogaya Kagaku K.K.), Sumiacryl Red 5B (C.I. Basic Violet 16, Sumitomo Kagaku Kōgyō K.K.), Diacryl Brilliant Red 5B-F (C.I. Basic Violet 16, Mitsubishi Kasei K.K.), Aizen Cathilon Red 7BNH (C.I. Basic Violet 27, Hodogaya Kagaku K.K.), Aizen Cathilon Brilliant Red SBH (C.I. Basic Violet 40, Hodogaya Kagaku K.K.), and Astrazon Blue FRR (C.I. Basic Blue 69, Beyer A.G.);

Triarylmethane basic dyes such as Aizen Methyl Violet Pure (C.I. Basic Violet 1, Hodogaya Kagaku K.K.), Aizen Crystal Violet (C.I. Basic Violet 3, Hodogaya Kagaku K.K.), Aizen Brilliant Basic Cyanine 6GH (C.I. Basic Blue 1, Hodogaya Kagaku K.K.), Astrazon Blue B (C.I. Basic Blue 5, Beyer A.G.), Aizen Diamond Green (C.I. Basic Green 1, Hodogaya Kagaku K.K.), Aizen Malachite Green (C.I. Basic Green 4, Hodogaya Kagaku K.K.), Magenta (C.I. Basic Violet 14), and Victoria Blue (C.I. Basic Violet 10);

Monoazo basic dyes such as Astrazon Orange RRL (C.I. Basic Orange 28, Beyer A. G.), Astrazon Red BBL (C.I. Basic Red 23, Beyer A. G.), Kayacryl Red GL (C.I. Basic Red 29, Nihon Kayaku K.K.), Astrazon Bordeaux BL (C.I. Basic Violet 19, Beyer A. G.), Kayacryl Blue GRL (C.I. Basic Blue 41, Nihon Kayaku K.K.), and Diacryl Blue RBL-N(C.I. Basic Blue 57, Mitsubishi Kasei K.K.);

Cyanine basic dyes such as Aizen Cathilon Brilliant Red 4GH (C.I. Basic Red 14, Hodogaya Kagaku K.K.), Aizen Cathilon Brilliant Yellow 5GLH (C.I. Basic Yellow 13, Hodogaya Kagaku K.K.), and Diacryl Yellow 2GLN (C.I. Basic Yellow 66, Mitsubishi Kasei K.K.);

Naphthostyryl basic dyes such as Diacryl Brilliant Blue H2R-N (C.I. Basic Blue 105(S), Mitsubishi Kasei K.K.), and Diacryl Brilliant Blue HB-N (C.I. Basic Blue 106(S), Mitsubishi Kasei K.K.);

Thiazine basic dyes such as Aizen Methylene Blue FZ (C.I. Basic Blue 9, Hodogaya Kagaku K.K.);

Acridine basic dyes such as Acradine Yellow G (C.I. 46025), Rheonin AL (C.I. 46075), Benzoflavine (C.I. 46065), and Phosphine (C.I. 46045);

Oxazine basic dyes such as Aizen Cathilon Pure Blue 5GH (C.I. Basic Blue 3, Hodogaya Kagaku K.K.); and Xanthene basic dyes such as Aizen Rhodamine BH (C.I. Basic Violet 10, Hodogaya Kagaku K.K.).

The carbinol bases used in the present invention are obtained, for example, by causing the above enumerated basic dyes to react with alkalis in an aqueous system.

The carbinol base derivatives are those of the ether type obtained, for example, by causing the same dyes to react with alcoholates in place of alkalis in a solvent, and represented by the general formula:

$$Dy-O-R$$

wherein Dy is a cationic dye residue, and R is an alkyl group having from 1 to 4 carbon atoms, a benzyl group or a phenyl group.

Of these carbinol base derivatives, those wherein R is a lower alkyl, particularly a methyl or ethyl group are desirable.

These carbinol bases of basic dyes or their derivatives (hereinafter covered by the term "coloring agent") are ordinarily used in the ink composition of this invention in a quantity of from 0.1 to 10%, all the percentages used herein and hereafter being "% by weight". With less than 0.1% of the coloring agent, no sufficient tinting strength will be obtained.

For the strong base used in this invention in combination with the coloring agent, any of the bases generally known as strong bases can be used.

Examples of these bases are: hydroxides or alcoholates of alkali metals or alkaline earth metals such as lithium, sodium, potassium, beryllium, magnesium, calcium, barium, and strontium; carbonates or bicarbonates of the alkali metals or alkaline earth metals; salts of strong bases and weak acids such as acetates, formates, butyrates, stearates, sulfinates, cyanates, isocyanates, and thiocyanates of alkali metals; phosphates of alkali metals, and salts of acids capable of causing decarboxylation such as sodium tartrate, and sodium oxalate; oxides of alkaline earth metals or hydrates thereof.

Of the above mentioned strong bases, hydroxides or alcoholates of alkali metals or alkaline earth metals are particularly desirable. These bases can be used singly or in a combination of two or more members.

The strong base is used in a quantity of from 1 to 40 moles, preferably from 2 to 20 moles, for 1 mole of the coloring agent, and ordinarily from 0.1 to 10%, preferably from 0.5 to 5%, of the ink composition. Less than 0.1% of the strong base will not stabilize the coloring agent satisfactorily, while the addition of more than 10% of the strong base not only will be useless but also will be undesirable because the other ingredients will be diluted therewith.

As a result of our investigation, it has been found that, in addition to the state of the coloring agent alone, the state of the ink ingredients including the coloring agent, the strong base, the binder and the solvent seriously affects the storage stability of the ink or the transfer sheet. If the respective ingredients are in completely dissolved state, the storage stability of the ink is further improved. In the case of a transfer sheet prepared with an ink containing undissolved ingredients, it is difficult to form on the substrate sheet thereof a coloring layer of a uniformly and densely colored pattern, and such a transfer sheet tends to be easily attacked by the ambient air and thus the storage stability thereof would be reduced.

Accordingly, it is preferable that the type and quantity of the strong base to be used be determined in relation to the solvent, the binder and the coloring agent, particularly to the solvent, so that an ink in completely dissolved state can be obtained. When sodium hydroxide and potassium hydroxide among the above enumerated strong bases are used in the specified quantity range, particularly high storage stability and good color development can be achieved.

For the binder, any of film forming organic resins can be used.

Specific examples of such resins are: cellulose derivative such as ethyl cellulose, carboxymethyl cellulose, cellulose butyrate, cellulose acetate, ethylhydroxyethyl cellulose, hydroxypropyl cellulose, hydroxypropyl methyl cellulose, benzyl cellulose, hydroxyethyl cellulose, and derivatives of the aforesaid cellulose derivatives; polyvinyl alcohol, polyvinyl acetate, polyvinyl butyral, polyvinyl formal, polycarbonate resins, polyester resins, polyamide resins, silicon resins, furan resins, and aminoplasts; homopolymers or copolymers of various vinyl monomers, for example, unsaturated carboxylic acids such as acrylic acid (including a salt thereof), methacrylic acid, itaconic acid, fumaric acid and maleic acid, or ester derivatives, nitrile derivatives or acid amide derivatives thereof, vinyl chloride, vinylidene chloride, vinyl acetate, styrene, vinyl pyrrolidone, vinyl methyl ether, butadiene, ethylene, propylene, isobutene, cumarone, indene, terpene, vinyl acetal, vinyl ether, and vinyl benzal; and halogen containing resins, nitrogen containing vinyl polymers, diene polymers, polyurethane, polyurea, polyether, various hard resins (such as phenolic resins, modified phenolic resins, modified maleic resins, modified alkyd resins, petroleum resins, ketone resins, xylene resins, ester gum, lime resins, maleic acid-modified rosin, and rosin).

These binders should not cause a chemical reaction with the coloring agent or the strong base, and should have an appropriate melt viscosity that would not prevent the sublimation and diffusion of the particles of the coloring agent during heat transfer operation.

It is also preferable that the binder be completely dissolved in the ink composition, retain good printability and coating properties, and do not accelerate decomposition of the coloring agent with the lapse of time.

Particularly desirable binders, from this standpoint are cellulose ethers or esters such as ethyl cellulose, ethylhydroxyethyl cellulose, hydroxypropyl cellulose, hydroxypropylmethyl cellulose; and vinyl polymers such as polyvinyl alcohol, polyvinyl formal, polyvinyl butyral, polyvinyl acetate and polyvinyl pyrrolidone.

The binder is ordinarily used in the ink composition at a concentration of from 5 to 20%. When less than 5% of the binder is used, the binding strength will be too low, while the use of more than 20% of the binder not only will be uneconomical but also will be undesirable because the heat transfers ability and diffusibility of the coloring agent will be hindered. As mentioned earlier, it is preferable that the binder have a viscosity suitable for printing or coating at the concentration specified herein.

For the solvent which is a major ingredient of the ink composition, at least a solvent capable of dissolving the binder is used. Examples of such solvents are heptane, isoheptane, isooctane, industrial gasolines #1 (benzine), #2 (rubber gasoline), #3 (soybean gasoline), #4 (mineral spirit) and #5 (cleaning solvent) according to Japanese Industrial Standards K2201, petroleum benzine, ligroin, cyclohexane, methylcyclohexane, benzene, toluene, xylene, light solvent naphtha, turpentine oil, trichloroethylene, perchloroethylene, dichloropropane, amyl chloride, dichloropentane, monochlorobenzene, O-dichlorobenzene, n-propyl alcohol, isopropyl alcohol, n-butyl alcohol, isobutyl alcohol, sec-butyl alcohol, tert-butyl alcohol, isoamyl alcohol, fusel oil, methyl isobutylcarbinol, 2-ethylbutanol, 2-ethylhexanol, cyclohexanol, phenol, cresol, furfuryl alcohol, tetrahydrofurfuryl alcohol, n-butyl ether, dichloroethyl ether, anisole, dioxane, butyl formate, amyl formate, isopropyl acetate, butyl acetate, sec-butylacetic acid, amyl acetate, isoamyl acetate, 2-ethylhexyl acetate, cyclohexylacetic acid, ethyl propionate, butyl propionate, amyl propionate, butyl butyrate, diethyl carbonate, diethyl oxalate, methyl lactate, ethyl lactate, triethyl phosphate, ethylene glycol, ethylene monomethyl ether, ethylene monobutyl ether, ethylene monoacetate, ethylene monomethyl ether acetate, ethylene monoethyl ether acetate, diethylene glycol, diethylene monomethyl ether, diethylene monoethyl ether, propylene glycol, hexylene glycol, furfural, acetal, methyl isobutyl ketone, diisobutyl ketone, mesityl oxide, acetylacetone, diacetone alcohol, cyclohexanone, methyl cyclohexanone, nitromethane, nitroethane, 1-nitropropane, 2-nitropropane, acetonitrile, diethylamine, triethylamine, cyclohexylamine, aniline, pyridine, picoline, monoethanolamine, morpholine, dimethylformamide, thiophene, sulfolane, dimethyl sulfoxide, lacquer thinner, thinner for vinyl chloride resin coating materials, thinner for cashew resin coating materials, thinner for leadless coating materials for toys, and acetylcellulose thinner. The solvent to be used in the invention is selected from the above listed solvents so that it dissolves the binder and causes no undersirable interaction with the coloring agent and the strong base.

The solvent must dissolve the binder as set forth hereinbefore, and it has further been found desirable that the solvent also dissolve the coloring agent and the strong base to give an ink composition in uniformly dissolved state.

In order to ensure uniform dissolution of the ingredients including the coloring agent and the strong base, it is necessary to select a specific solvent. It has also been found that, even if a solvent system capable of providing uniform dissolution is used, an ink composition possessing sufficient storage stability cannot be obtained unless the components of the solvent system and the ratio therebetween, which are of great importance, are appropriately selected (see the "solvent test" which will be described hereinafter).

In view of the foregoing findings, a solvent system most suitable for use in this invention is a solvent system comprising 80% by weight or more of a monohydric alcohol having from 3 to 6, preferably from 4 to 6, carbon atoms singly, or a mixture of said monohydric alcohol and at least one secondary solvent component selected from butyl acetate, isopropyl acetate, toluene, xylene and methyl isobutyl ketone.

The term "monohydric alcohol" as used herein includes an alcohol wherein part of the hydrogen in the hydrocarbon moiety is substituted by a substituent, preferably an alkoxy group, the total carbon atoms being from 3 to 6. An alcohol having less than 3 carbon atoms ensures uniform dissolution, but reduces the storage stability of the ink composition. When an alcohol having more than 6 carbon atoms is used, the printability, particularly drying efficiency of the ink composition becomes poor.

Examples of desirable monohydric alcohols are isopropyl alcohol, butanol, amyl alcohol, methyl amyl alcohol, methyl cellosolve, and ethyl cellosolve, among which butanol, amyl alcohol, methyl amyl alcohol, and ethyl cellosolve are especially preferable.

These monohydric alcohols are preferably used with at least one secondary solvent component selected from butyl acetate, isopropyl acetate, toluene, xylene, and methyl isobutyl ketone. These secondary solvent components are used in order to obtain improved viscosity stability and printability without reducing the storage stability of the ink composition.

The solvent of this invention preferably comprises 80% by weight of more of at least one of the above enumerated monohydric alcohols singly or a total of the monohydric alcohol and a secondary solvent component, if used. This is because a solvent system containing a large quantity of components other than those specified above reduces the storage stability of the ink composition. For example, the addition of water, methyl alcohol, ethyl alcohol, ethyl acetate and methyl ethyl ketone is undesirable because the storage stability of the ink composition will be adversely affected thereby. For this reason, it is most preferable that no such solvents and other conventional solvent components be used, and it is preferable that these solvents be used, if desired, in a quantity not exceeding 20% by weight of the solvent system of this invention.

The ratio of the monohydric alcohol to the secondary solvent component used ranges from 1/9 to 10/0, preferably from 2/8 to 4/6.

The above described solvent system constitutes the remainder of the ink compositions of this invention.

The ink compositions of this invention may optionally comprise other additives commonly used in inks for heat transfer printing thereby to improve its printability and other properties. For example, as a coloring additive which, when the coloring agent is transfer-printed onto a transfer receiving base material, permeates through the base material and causes the micelles to swell, thus effectively enhancing the permeability of the dye, urea, naphthalene, ammonium tartrate, glycosine A, oxalates of aliphatic amines such as cyclohexylamine, ammonium acetate, benzylamine, and various types of surfactants such as anionic, nonionic and ampholytic surfactants can be used.

Examples of other optional additives are plasticizers, stabilizers, waxes, greases, drying agents, auxiliary drying agents, hardening agents, emulsifiers, dispersants, thickeners, fillers, pigments and dyes. Among these additives, pigments and dyes are particularly required for the purpose of giving color to the ink, for example, in the case where the coloring agent used in this invention develops its color only when it has been transfer-printed, and non-sublimable pigments and dyes are ordinarily used.

These optional additives are used in appropriate quantities in the known range according to purposes, and need not necessarily be dissolved in the ink.

The ink composition of this invention can be obtained by mixing the ingredients with the solvent mentioned above by an ordinary method, if desired, under heat.

As shown in the sectional view of FIG. 1, the transfer sheet 4 of this invention has a substrate sheet 1 consisting of any sheet-form material such as paper and a plastic film onto which the ink composition of the invention obtained in the above described manner is applied by any printing method such as the gravure printing process, offset printing process, relief printing process and silk screen process in a quantity, for example, of from 0.2 to 4 g/m$^2$ (dry basis) to form a coloring layer 2 of any desired pattern on the substrate sheet 1. It is possible, if desired, to further provide an overcoat layer 3 consisting of a film-forming resin over the coloring layer 2 as shown in FIG. 2.

One example of the ratio between the respective components of the coloring layer 2 is : a coloring agent, 1 to 80%; a strong base, 1 to 40 moles, preferably 2 to 20 moles, for 1 mole of the coloring agent, and 1 to 80%, preferably 2 to 40%, of the coloring layer; and the remainder, a binder and any optional additives. When less than 1% of the coloring agent is used, only poor color will be developed, while the addition of more than 80% of the coloring agent not only will be ineffective but also will deteriorate the physical properties of the coloring layer. The strong base in a quantity less than the lower limit will result in a poor stabilizing effect, while that in a quantity exceeding the upper limit will be effective and undesirable because the other ingredients will be diluted therewith.

Figure 2:
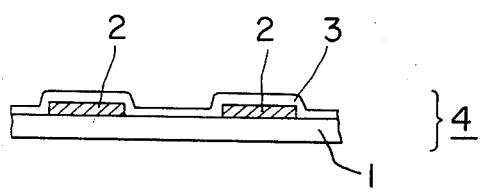

The overcoat layer 3 as shown in FIG. 2 is obtained by applying any of the film forming resins, which were set forth hereinbefore and the binder, dissolved in the above mentioned solvent at a concentration of, for example, from 5 to 20% by means of any coating method such as the bar coating method, the roller coating method and the gravure coating method, and drying the resin to form a layer of from 0.5- to 10-μm thickness.

This overcoat layer 3 may be omitted, and may be provided depending on the necessity in order to control the contact between the coloring layer 2 and the transfer receiving base material.

Next, the heat transfer printing process using a transfer sheet thus obtained according to this invention will be described.

For the base material to receive the transfer pattern in accordance with this invention, sheet-form materials consisting of fibers dyeable with cationic dyes can be used. Typical examples of such fibers are: polyacrylonitrile, copolymers of acrylonitrile, styrene-p-sulfonate and vinyl compounds such as vinyl chloride, vinylidene chloride, vinyl alcohol, methylacrylates or amides; or acid-modified polyesters such as polyesters, particularly aromatic polyesters, modified with acid radicals such as a sulfonic acid group, and polyamides, and blended yarn fiber products or mix-woven fiber products predominantly comprising the same.

Figure 3:
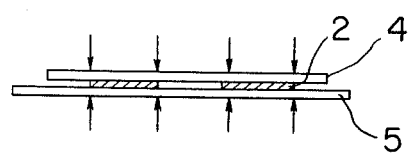
FIG. 3 is a sectional view conceptually showing the printing step in the heat transfer printing process according to the present invention.

As shown in FIG. 3, a transfer receiving base material 5 consisting of the above described fiber dyeable with cationic dyes and the transfer sheet 4 are mutually superposed so that the surface provided with the coloring layer 2 of the latter contacts the surface of the former, and the superposed base material and sheet are then maintained at a temperature of from 80° to 250° C., preferably from 150° to 230° C., and under a pressure of from 20 g to 20 kg/cm² for 10 to 180 sec., preferably 20 to 90 sec., whereby the heat transfer printing process of this invention is accomplished.

Heat and pressure can be applied either by interposing the transfer sheet 4 and the transfer receiving base material 5 between a pair of hot plates, or by pressing the same against a heating drum. Heating is preferably applied from the side of the transfer sheet 4.

When the fiber products dyeable with cationic dyes are subjected to the heat transfer printing as described hereinabove, no sufficient color development may be obtained in some cases. In order to eliminate such drawbacks, a preferred embodiment of the present invention involves a pretreatment comprising immersing under heat the fibers in a solution containing at least one of compounds having in the molecule thereof an ammonium group, an amino group or an acid amide group, organic acids, or inorganic acids (hereinafter referred to as "color developer"); at least one of nonionic surfactants, or blended nonionic-anionic surfactants (hereinafter referred to as "homogenizing agent"); and water. By subjecting the fiber products to this pretreatment, the color develops very clearly and uniformly, and transfer-printed products with splendid luster and high durability can be obtained in an easy and stable manner.

The pretreating solution basically consists of a color developer, a homogenizing agent and water, and a solution containing 5 to 100 g of color developer and 0.5 to 3 g of a homogenizing agent, respectively, for 1 l of water is preferably used. Less than 5 g of a color developer for 1 l of water results in a poor color developing effect, while more than 100 g of this developer causes saturation of a color developing effect, thus reduces color developing efficiency, and may further deteriorate the fiber product to be transfer-printed depending on the type of a color developer selected. On the other hand, less than 0.5 g of a homogenizing agent results in a poor soil-removing effect and may sometimes cause uneven dyeing, while more than 3 g of this agent exceeds the concentration required.

The color developer has in the molecule thereof a dissociable ammonium cation and a proton, while there is ordinarily a sodium cation at the terminal position of a compound constituting the fiber dyeable with cationic dyes. Accordingly, by subjecting the material to be transfer-printed to a heat treatment in the color developing solution, the ammonium cation and the proton undergo ion exchange with the sodium cation.

The terminal group of the fiber dyeable with cationic dyes is converted to $-SO_3NH_4$ by the ion exchange, and the terminal portions of the fiber become highly active because of the decomposition of ammonium due to heat generated during transfer printing operation, whereby the transfer-printability of the fiber is enhanced.

For the above mentioned color developer, aqueous ammonia; compounds having an ammonium group such as ammonium chloride, ammonium acetate, ammonium nitrate, ammonium sulfate, ammonium phosphate, ammonium oxalate, ammonia tartrate, and ammonium sulfamate; compounds having an amino group such as methylamine, ethylamine, and sulfamic acid; and compounds having an acid amide group such as formamide, acetic amide, oxalic amide, and urea; or inorganic acids such as hydrochloric acid, nitric acid, phosphoric acid, and sulfuric acid; and organic acids such as formic acid, acetic acid, propionic acid, oxalic acid, tartaric acid, and succinic acid, can be used, and any of these compounds or acids shows remarkable advantages.

For the homogenizing agent, nonionic surfactants such as polyoxyethylene alkyl ethers, polyoxyethylene alkylphenol ethers, polyoxyethylene alkyl esters, sorbitan alkyl esters, and polyoxyethylene sorbitan alkyl esters; or blended nonionic-anionic surfactants comprising the aforementioned nonionic surfactants and anionic surfactants such as salts of fatty acid, sulfates of higher alcohols, sulfates of liquid fatty oil, sulfates of aliphatic amines and amides, phosphates of fatty alcohols, sulfates of fatty acid amides, and alkylaryl sulfates can be used.

This homogenizing agent is used in order to remove soil from the material to be transfer-printed by utilizing the properties of the surfactant such as detergency and permeability and also to prevent floating of the material in the treating bath.

In accordance with this invention, a nonionic surfactant or a blended nonionic-anionic surfactant is used as a homogenizing agent since fibers principally comprising ionic fibers such as acrylic fibers as described above are treated.

To the pretreating solution having the above specified composition, preferably 0.5 to 3 g of an alkali agent per liter of water can further be added depending on the necessity. This alkali agent is particularly preferably added in order to remove by saponification impurities from the material to be transfer-printed which is heavily soiled, for example, with water-insoluble paste or oils.

It is desirable that the pretreating solution do not contain an excess of metal ions such as a sodium ion, and further be acidic, neutral, or weakly alkaline such as having a pH not exceeding 8. This is because, when these requirements are satisfied, the color developer converts the terminal group of the fiber from $-SO_3^-Na^+$ to $-SO_3^-NH_4^+$, i.e., causes ion exchange between $Na^+$ and $NH_4^+$, to promote the color development, and also because the color developer, being a salt or an acid, may sometimes be ineffective in the alkali range where the pH is 8 or higher.

The heat treatment of a fiber product dyeable with cationic dyes with a pretreating solution comprises heating a bath containing, for example, a solution of the above described composition, immersing the fiber product therein, and then washing the same with water followed by drying.

The heating may be advantageously conducted at a temperature not lower than the apparent transition point of the fiber, for example, about 80° to 90° C. in the case of acrylic fibers, and preferably 80° to 100° C. in most cases, for a period of about 5 to 60 min. After the heat treatment, it is desirable that the fiber product be cooled gradually so that the material to be transfer-printed will undergo no deformation.

As described hereinabove, by causing a coloring agent comprising a carbinol base of a basic dye or its derivative to coexist with a strong base in an ink or by further using a specific solvent system, the present invention has succeeded in the preparation of an ink for heat transfer printing and a transfer sheet obtained by using the same, both having remarkably improved storage stability while retaining the heat transferability of the coloring agent, whereby the commodity value of the ink and the transfer sheet is crucially enhanced.

In order to indicate more fully the nature and utility of this invention, the following specific examples of practice constituting preferred embodiments of the invention are set forth, it being understood that these examples are presented as illustrative only and not intended to limit the scope of the invention. Throughout these examples, quantities expressed in "parts" are "parts by weight".

EXAMPLE 1

100 parts of polyvinyl butyral (trade name: Eslec BL-1, manufactured by Sekisui Kagaku K.K.), 50 parts of the carbinol base of Aizen Cathilon Pink FGH (C.I. Basic Red 13(48015), a basic dye manufactured by Hodogaya Kagaku K.K.), 95 parts of sodium carbonate, and 5 parts of Teepol B18(an anionic surfactant manufactured by Daiichi Kōgyō Seiyaku K.K.) were thoroughly kneaded with 750 parts of a xylene/isopropyl alcohol (1:1) solvent mixture to prepare a red ink composition.

This ink composition was applied on a gravure paper by the gravure process to form a desired pattern, whereby a transfer sheet was obtained.

The transfer sheet thus obtained was superposed on plain weave cloth of a polyacrylonitrile fiber of 0.4-mm thickness, and both were heated with an iron heated to 180° C. for 30 seconds. By peeling off the sheet from the cloth, transfer-printed cloth which was clearly printed with red color was obtained.

The ink composition and the transfer sheet obtained above did not substantially deteriorate even after storage for 2 months while those obtained in the absence of sodium carbonate deteriorated in 48 hours.

Similiar results were obtained with a blue ink composition prepared by replacing the carbinol base of Aizen Cathilon Pink FGH described above by the carbinol base of Astrazon Blue FRR (C.I. Basic Blue 69 manufactured by Beyer A.G.).

Further, polyester cloths dyeable with cationic dyes were similary transfer-printed by using the above transfer sheets, whereupon transfer-printed cloths printed respectively with red and blue colors were obtained. These results clearly show that these ink compositions can be used for polyester cloth dyeable with cationic dyes.

EXAMPLE 2

10 parts of Diacryl Golden Yellow GL-N (C.I. Basic Yellow 28) and 2 parts of sodium methylate were caused to react with each other in 88 parts of thoroughly dehydrated methanol, and then the methyl derivative of the carbinol base of the dye (coloring agent) was obtained in the usual way.

Subsequently, 5 parts of the coloring agent thus obtained, 10 parts of ethyl cellulose (N-7CP, Hercules Company), and 2 parts of sodium hydroxide were thoroughly kneaded with 80 parts of a xylene/butanol (1:1) solvent mixture to prepare a yellow ink composition.

By using the ink composition, a transfer sheet was produced, and transfer-printed cloth of yellow color was obtained by the transfer process in the same manner as in Example 1.

The ink composition and the transfer sheet showed the same storage stability as those obtained in Example 1.

On the other hand, an ink composition prepared in the same manner except that no sodium hydroxide was added and a transfer sheet obtained by using the same had good transferability, but resulted in discoloration after storage for about 48 hours.

EXAMPLE 3

An ink comprising 10 parts of ethyl cellulose, 4 parts of the carbinol base of Aizen Cathilon Yellow 3GLH (C.I. Basic Yellow 11 (48055), 2 parts of sodium hydroxide, and 84 parts of a xylene/butanol (1:1) solvent mixture was applied on a gravure paper by the gravure process to form a desired pattern, whereby a transfer sheet was obtained.

By using the transfer sheet thus obtained, cloth of an acrylic fiber (Casimilon manufactured by Asahi Kasei K.K.) was transfer-printed at a temperature of 200° C. and under a pressure of 1 kg/cm² for 30 seconds, whereupon clearly printed cloth was obtained.

There was no difference between the transfer-printed cloth obtained with a transfer sheet stored for 2 months after preparation and that similarly obtained with a freshly prepared transfer sheet.

On the other hand, a transfer sheet obtained by using an ink prepared in the same manner as is described above except that no sodium hydroxide was added resulted in reduction in concentration in a pale-colored portion after storage for about 48 hours.

EXAMPLE 4

An ink comprising 8 parts of ethylhydroxyethyl cellulose, 5 parts of the carbinol base of Aizen Cathilon Pink FGH (C.I. Basic Red 13), 5 parts of potassium carbonate and 82 parts of a xylene/butanol (7:3) solvent mixture was applied on a glassine paper by the gravure process to form a desired pattern, whereby a transfer sheet was obtained.

Subsequently, cloth of an acrylic fiber (Vonnel, Mitsubishi Rayon K.K.) was immersed in a bath containing 30 g of ammonium tartrate, 3 g of a nonionic surfactant (Noigen HC, Daiichi Kōgyō Seiyaku K.K.) and 3 g of sodium tripolyphosphate, respectively, for 1 l of water, the weight ratio of the cloth to the bath (bath ratio) being 1:30, at 90° C. for 15 minutes. After the cloth thus treated was washed with water and dried, heat transfer was carried out with the above described transfer sheet at 200° C. for 30 seconds under a pressure of 1.0 kg/cm², whereupon clearly and uniformly transfer-printed cloth of satisfactory color fastness was obtained.

A comparative sample prepared from cloth treated with only ammonium tartrate and transfer-printed under the same conditions was found to be unevenly printed in part.

EXAMPLE 5

Cloth of a polyester fiber dyeable with cationic dyes (Toraylon, plain weave fabric, Toray K.K.) was immersed in a bath containing 40 g of urea and 3 g of a nonionic surfactant (Solge MH-7, Meisei Kagaku K.K.), respectively, for 1 l of water, the bath ratio being 1:30, at 90° C. for 15 minutes. After the cloth thus treated was washed with water and dried, heat transfer was carried out with the same transfer sheet as in Example 1 at 200° C. for 30 seconds under a pressure of 1.0 kg/cm², whereupon clearly and uniformly transfer-printed cloth of satisfactory color fastness and obtained.

A comparative sample prepared from cloth treated with only urea and transfer-printed under the same conditions was found to be unevenly printed in part.

EXAMPLE 6

100 parts of ethyl cellulose (Ethyl Cellulose N-7CP, Hercules Company), 30 parts of the carbinol base of Diacryl Pink R-N (C.I. Basic Red 35, a red basic dye, Mitsubishi Kasei Kōgyō K.K.), and 50 parts of sodium hydroxide were thoroughly kneaded with 820 parts of a toluene/butanol (1:1) solvent mixture to prepare a red ink composition.

This ink composition was then applied on a gravure paper by the gravure process to form a desired pattern, whereby a transfer sheet was obtained.

The transfer sheet thus obtained was superposed on plain weave cloth of polyacrylonitrile fiber of 0.4-mm thickness, and both were heated with iron heated to 180° C. for 30 seconds. By peeling off this sheet, transfer-printed cloth clearly colored in dark red was obtained.

The same transfer printing was carried out with a transfer sheet obtained in the same manner by using the above described ink composition which had been stored for 2 months at room temperature. The transferred pattern on the transfer-printed cloth thus obtained was found to have undergone substantially no reduction in concentration as compared with that obtained by using a freshly prepared ink composition.

Similar results were obtained when transfer printing was carried out with a transfer sheet obtained by using the above ink composition after the sheet was stored for 2 months at room temperature.

Solvent Test

The influence of solvents on the storage stability of inks was evaluated by replacing 820 parts of the toluene/butanol (1:1) solvent mixture used in Example 6 by the same quantity of each solvent mixture shown in Table 1 below.

The results obtained are listed in the same Table.

TABLE 1(A)

| Solvent | Run No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Monohydric alcohol | | | | | | | | | | | | | | | | | | | | | | | |
| Isopropyl alcohol | | | 2 | | | | | | | 3 | | | | | | | | | 1 | | | | |
| Butanol | | 2 | | | 2 | | | | | 3 | | | | | 2 | 3 | | 1 | 2 | 3 | | 10 | 5 |
| Methyl cellosolve | | | | | | | | | | | | | | 3 | | | 3 | | | 3 | | | |
| Ethyl cellosolve | | | | | 2 | | 2 | | | | | | | 3 | | | 2 | | | | | 5 |
| Secondary solvent component | | | | | | | | | | | | | | | | | | | | | | | |
| Butyl acetate | | 4 | | | | | 4 | | | | | | | | | | | | | | | | |
| Toluene | | 4 | 4 | 4 | 4 | 4 | 4 | | 7 | 7 | 7 | 7 | 7 | 7 | 4 | | 3 | | | 3 | | | |
| Xylene | | | | | | | | | | | | | | | | 7 | 4 | 7 | 4 | | | | |
| Methyl isobutyl ketone | | | | | | | | | | | | | | | | | 4 | | | | | | |
| Isopropyl acetate | | | | | | | | | | | | | | | | | | | | 3 | 7 | 4 | |

TABLE 1(B)

| Solvent | Run No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Other Solvent Components | | | | | | | | | | | | | | | | | | | | | | | |
| Methanol | | | 2 | | | | 2 | | 3 | | | | | | | | | | | | | | |
| Ethanol | | | | | | | | | | 3 | | | | | | | | | | | | | |
| Ethyl acetate | | | 4 | 4 | | | | | | | | | | | | | | | | | | | |
| Methyl ethyl ketone | | | | | 4 | 4 | 4 | 4 | | | | | | | | | | | | | | | |
| Storage Stability* | | | | | | | | | | | | | | | | | | | | | | | |
| Immediately after preparation of ink | | O | O | O | O | O | Δ | O | O | O | O | O | O | O | O | O | O | O | O | O | O | O | O |
| After 3-day storage | | O | X | X | X | X | X | X | X | X | O | O | O | O | O | O | O | O | O | O | O | O | O |
| After 30-day storage | | O | X | X | X | X | X | X | X | X | Δ | O | Δ | O | Δ | O | Δ | O | Δ | Δ | Δ | O | O |
| After 60-day storage | | Δ | X | X | X | X | X | X | X | X | X | O | X | O | X | O | X | O | X | X | O | O |

TABLE 1(B)-continued

| Solvent Run No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| | | | | | | Weight Ratio Between Solvents | | | | | | | | | | | | | | | | |
| Classification** | In | Out | Out | Out | Out | Out | Out | Out | Out | In | In | In | In | In | In | In | In | In | In | In | In | In |

Footnotes:
*O : 5th or 4th–5th grade on the Grey scale for discoloration
Δ : 4th or 3rd–4th grade on the Grey scale for discoloration
X : 3rd or lower grade on the Grey scale for discoloration
**Classification indicates whether the sample falls within preferred solvents or not.
In : within preferred solvents
Out : Out of preferred solvents The procedure for evaluation of the storage stability of each ink was such that transfer sheets produced in the same manner as in Example 6 by using ink compositions prepared in the presence of the above described solvents immediately after preparation, and after storage for 3 days, 30 days and 60 days at room temperature were used to transfer-print cloths by the same transfer process as in Example 6, and that the appearance of each transfer-printed cloth thus obtained was examined with the eye according to the following standard:

Examination Standard:

The cloth samples were examined by means of the Grey scale for discoloration (JIS L0804) specified in the color fastness test method in accordance with Japanese Industrial Standard (JIS) and by the same measurement method as that for measuring discoloration of dyed fibers.

Further, the samples thus examined were graded O, Δ and X as set forth in the footnotes to Table 1.

EXAMPLES 7 THROUGH 10 & COMPARATIVE EXAMPLES 1 through 11

With ink compositions prepared by replacing the solvent in the ink composition of Example 6 by each solvent shown in Table 2 as in the solvent test described hereinabove or further by excluding sodium hydroxide therefrom, the influence of these ink components on the storage stability of each ink was tested as in the aforementioned solvent test.

In any case where freshly prepared inks were used, satisfactory transfer-printed cloths were obtained, while in the case where inks after storage for 3 days, 30 days and 60 days were used, the results obtained were as shown in Table 2. It will be noted from the results that these components seriously affect the storage stability of each ink.

TABLE 2

| Example No. | Basic dye (parts) | Resin (parts) | Sodium hydroxide (parts) | Solvent | (parts) | After 3 days | After 30 days | After 60 days |
|---|---|---|---|---|---|---|---|---|
| Example 7 | 30 | 100 | 50 | Toluene/Butanol = 7/3 | 820 | O | O | O |
| Example 8 | " | " | " | Toluene/Isopropyl alcohol = 7/3 | " | O | Δ | X |
| Comparative Example 1 | " | " | " | Toluene/Ethanol = 7/3 | " | X | X | X |
| Comparative Example 2 | " | " | " | Toluene/Butanol/Ethanol = 4/3/3 | " | X | X | X |
| Example 9 | " | " | " | Toluene/Butanol/Butyl acetate = 4/3/3 | " | O | O | Δ |
| Example 10 | " | " | " | Toluene/Butanol/Ethyl cellosolve = 4/3/3 | " | O | O | O |
| Comparative Example 3 | " | " | " | Toluene/Butanol/Methyl ethyl ketone = 4/3/3 | " | X | X | X |
| Comparative Example 4 | " | " | 0 | Toluene/Butanol = 5/5 | " | O | Δ | X |
| Comparative Example 5 | " | " | " | Same as Example 7 | " | Δ | X | X |
| Comparative Example 6 | " | " | " | Same as Example 8 | " | X | X | X |
| Comparative Example 7 | " | " | " | Same as Comparative Example 1 | " | X | X | X |
| Comparative Example 8 | " | " | " | Same as Comparative Example 2 | " | X | X | X |
| Comparative Example 9 | " | " | " | Same as Example 9 | " | O | Δ | X |
| Comparative Example 10 | " | " | " | Same as Example 10 | " | O | Δ | X |
| Comparative Example 11 | " | " | " | Same as Comparative Example 3 | " | X | X | X |

Composition of Ink / Storage Stability of Ink

EXAMPLE 11

An ink composition comprising 10 parts of ethyl cellulose, 5 parts of the carbinol base of Aizen Cathilon Yellow 3GL-H, a yellow dye (C.I. Basic Yellow 11

(48055)), 5 parts of sodium hydroxide, and 84 parts of a toluene/butanol (1:1) solvent mixture was prepared.

9 parts of this ink composition was admixed with 1 part of the ink composition of Example 6 to prepare an orange ink composition.

This ink composition was then applied on a glassine paper by the gravure process to form a desired pattern, whereby a transfer sheet was obtained.

The above described ink composition and transfer sheet were subjected to the same 2-month storage test as in Example 6 and found to have similar storage stability.

EXAMPLES 12 THROUGH 14 & COMPARATIVE EXAMPLES 12 THROUGH 19

The red dye of Example 6 and the yellow dye of Example 11 were used in the blending ratios set forth in Table 3 to prepare orange ink compositions, and the storage stability of each of the ink compositions was tested in the same manner.

The use of any of the freshly prepared orange ink compositions resulted in good transfer-printability, and the results obtained from the inks after storage for 3 days, 30 days and 60 days were as shown in Table 3 below.

EXAMPLE 15

100 parts of ethyl cellulose (Ethyl Cellulose N-7CP, Hercules Company), 50 parts of the carbinol base of Aizen Basic Cyanine 6GH (C.I. Basic Blue 1, a basic dye, Hodogaya Kagaku K.K.), and 50 parts of sodium hydroxide were thoroughly kneaded with 800 parts of a toluene/butanol (1:1) solvent mixture to prepare a blue ink composition.

1 part of this ink composition was admixed with 9 parts of the yellow ink composition of Example 11 to prepare a green ink composition.

The above described ink composition and transfer sheet obtained therefrom were subjected to the same 2-month storage test as in Example 6 and found to have similar storage stability.

EXAMPLES 16 THROUGH 18 & COMPARATIVE EXAMPLES 20 THROUGH 27

The storage stability corresponding to that of Example 15 was tested in these Examples with ink compositions prepared by adding to 45 parts of the yellow dye of Example 11, 5 parts of the blue dye of Example 15 and 100 parts of ethyl cellulose the solvents and sodium

TABLE 3

| Example No. | Composition of Ink | | | | | | Storage Stability of Ink | | |
|---|---|---|---|---|---|---|---|---|---|
| | Yellow dye (parts) | Red dye (parts) | Ethyl cellulose (parts) | NaOH (parts) | Solvent | (parts) | After 3 days | After 30 days | After 60 days |
| Example 12 | 45 | 5 | 100 | 50 | Toluene/Butanol = 7/3 | 800 | O | O | O |
| Example 13 | " | " | " | " | Toluene/Isopropyl alcohol = 7/3 | " | O | Δ | X |
| Comparative Example 12 | " | " | " | " | Toluene/Ethanol = 7/3 | " | X | X | X |
| Comparative Example 13 | " | " | " | " | Toluene/Butanol/Ethanol = 4/3/3 | " | X | X | X |
| Example 14 | " | " | " | " | Toluene/Butanol/Butyl acetate = 4/3/3 | " | O | O | Δ |
| Comparative Example 14 | " | " | " | (part) 0 | Same as Example 12 | " | Δ | X | X |
| Comparative Example 15 | " | " | " | " | Same as Example 13 | " | X | X | X |
| Comparative Example 16 | " | " | " | " | Same as Comparative Example 12 | " | X | X | X |
| Comparative Example 17 | " | " | " | " | Same as Comparative Example 13 | " | X | X | X |
| Comparative Example 18 | " | " | " | " | Same as Example 14 | " | Δ | X | X |
| Comparative Example 19 | " | " | " | " | Toluene/Butanol = 5/5 | " | Δ | X | X |

The deterioration of inks of a mixed color appeared as a change in hue from orange to yellow. This is considered to be because the red dye, which was used in such a small quantity as 10%, was more liable to undergo a considerable change.

hydroxide in the quantities shown in Table 4.

The use of any of the freshly prepared ink compositions resulted in good transfer-printability, and the results obtained from the inks after storage for 3 days, 30 days and 60 days were as shown in Table 4 below.

The deterioration of inks appeared as a change in hue from green to yellow.

TABLE 4

| Example No. | Additional Components | | | Storage Stability of Ink | | |
|---|---|---|---|---|---|---|
| | NaOH (parts) | Solvent | (parts) | After 3 days | After 30 days | After 60 days |
| Example 16 | 50 | Toluene/Butanol = 7/3 | 800 | O | O | O |
| Example 17 | " | Toluene/Isopropyl alcohol = 7/3 | " | O | Δ | X |
| Comparative Example 20 | " | Toluene/Ethanol = 7/3 | " | X | X | X |
| Comparative Example 21 | " | Toluene/Butanol/Ethanol = 4/3/3 | " | X | X | X |
| Example 18 | " | Toluene/Butanol/Butyl acetate = 4/3/3 | " | O | O | Δ |

TABLE 4-continued

| Example No. | Additional Components NaOH (parts) | Solvent | (parts) | Storage Stability of Ink After 3 days | After 30 days | After 60 days |
| --- | --- | --- | --- | --- | --- | --- |
| | (part) | | | | | |
| Comparative Example 22 | 0 | Same as Example 16 | " | Δ | X | X |
| Comparative Example 23 | " | Same as Example 17 | " | X | X | X |
| Comparative Example 24 | " | Same as Comparative Example 20 | " | X | X | X |
| Comparative Example 25 | " | Same as Comparative Example 21 | " | X | X | X |
| Comparative Example 26 | " | Same as Example 18 | " | Δ | X | X |
| Comparative Example 27 | " | Same as Example 15 | " | Δ | X | X |

EXAMPLES 19 THROUGH 22 & COMPARATIVE EXAMPLES 28 THROUGH 35

The storage stability was similarly tested with ink compositions prepared by adding to 9 parts of the yellow dye of Example 11, 45 parts of the blue dye of Example 15 and 100 parts of ethyl cellulose the solvents and sodium hydroxide in the quantities shown in Table 4.

The use of any of the freshly prepared ink compositions resulted in good transfer-printability, and the results obtained from the inks after storage for b 3 days, 30 days and 60 days were as shown in the following Table 5:

TABLE 5

| Example No. | Additional Component NaOH (parts) | Solvent | (parts) | Storage Stability of Ink After 3 days | After 30 days | After 60 days |
| --- | --- | --- | --- | --- | --- | --- |
| Example 19 | 50 | Toluene/Butanol = 5/5 | 796 | O | O | O |
| "20 | " | Toluene/Butanol = 7/3 | " | O | O | O |
| "21 | " | Toluene/Isopropanol = 7/3 | " | O | Δ | X |
| Comparative Example 28 | " | Toluene/Ethanol = 7/3 | " | X | X | X |
| Comparative Example 29 | " | Toluene/Butanol/Ethanol = 4/3/3 | " | X | X | X |
| Example 22 | " | Toluene/Butanol/Butyl acetate = 4/3/3 | " | O | O | Δ |
| | (part) | | | | | |
| Comparative Example 30 | 0 | Same as Example 19 | " | Δ | X | X |
| Comparative Example 31 | " | Same as Example 20 | " | Δ | X | X |
| Comparative Example 32 | " | Same as Example 21 | " | X | X | X |
| Comparative Example 33 | " | Same as Comparative Example 28 | " | X | X | X |
| Comparative Example 34 | " | Same as Comparative Example 29 | " | X | X | X |
| Comparative Example 35 | " | Same as Example 22 | " | Δ | X | X |

The deterioration of inks appeared as a change in hue from dark green to blue.

EXAMPLE 23

100 parts of ethyl cellulose (Ethyl Cellulose N-7CP, Hercules Company), 60 parts of a dye powder of Diacryl Pink R-N (C.I. Basic Red 35, a basic dye, Mitsubishi Kasei Kōgyō K.K.) having a concentration of 200%, and 50 parts of sodium hydroxide were thoroughly kneaded with 820 parts of a toluene/butanol (1:1) solvent mixture. The resulting mixture was then left standing for 2 days and the precipitate formed was removed, whereby a red ink composition was obtained.

The ink composition thus obtained was found to have the same storage stability as that of the ink composition of Example 6.

EXAMPLE 24

Ink compositions prepared by replacing the binder Ethyl Cellulose N-7CP and the alkali agent NaOH used in the ink compositions of Examples 6 through 23 and Comparative Examples 1 through 35 by ethyl hydroxyethyl cellulose and KOH, respectively, were found to have exactly the same storage stability.

EXAMPLE 25

The inks prepared in Examples 6 through 22 and Comparative Examples 1 through 35 were immediately applied on glassine papers by the gravure process to form desired patterns, whereby transfer sheets were obtained.

When the transfer sheets immediately after preparation were used to transfer-print cloths of an acrylic fiber (Casimilon, Asahi Kasei K.K.) under the conditions of 200° C. and 1 kg/cm² for 30 seconds, all the transfer-printed cloths obtained had good color development.

On the other hand, when a transfer sheet printed with a comparative ink wherein no sodium hydroxide was added was used for heat transfer 48 hours after ink-printing, the transfer-printed cloth obtained was reduced in concentration.

In contrast, in the case of a transfer sheet printed with an ink containing sodium hydroxide, there was no difference between the transfer-printed cloth obtained with a sheet 2 months after ink-printing and that obtained with a sheet immediately after ink-printing.

EXAMPLE 26

The ink composition of Example 23 was applied on a glassine paper by the gravure process to form a desired pattern, whereby a transfer sheet (1) was obtained.

Separately, the ink prepared as in Example 23 except that the kneaded ink components were not left standing for 2 days was applied on a glassine paper by the gravure process to form a desired pattern, whereby a transfer sheet (2) was obtained.

When the transfer sheets (1) and (2) were used to transfer-print cloths of an acrylic fiber (Casimilon, Asahi Kasei K.K.) under the conditions of 200° C. and 1 kg/cm$^2$ for 30 seconds, the transfer sheet (1) resulted in good color development while the transfer sheet (2) resulted in somewhat lower concentration.

When the transfer sheets (1) and (2) were stored for 2 months under the same conditions and thereafter used for the same transfer process as above, the transfer sheet (1) gave no change in transferred color concentration while the transfer sheet (2) gave reduction in transferred color concentration.

We claim:

1. An ink composition for heat transfer printing having enhanced stability on storage comprising:

from about 0.1 to about 10 weight percent of a coloring agent comprising at least one of a carbinol base of a basic dye or a carbinol base derivative, wherein said derivative is the product of the reaction between said basic dye and an alcoholate, and said coloring agent is sublimable at a temperature of from about 80° to about 250° C.;

from about 0.1 to about 10 weight percent of a strong base, wherein the mole ratio of said strong base to said coloring agent is from about 1:1 to about 40:1;

from about 5 to about 20 weight percent of a binder; and a solvent;

wherein all weight percents are based on the total weight of the composition.

2. An ink composition as claimed in claim 1 in which the strong base is selected from the group consisting of hydroxides and alcoholates of alkali metals and alkaline earth metals.

3. An ink composition as claimed in claim 2 in which the strong base is sodium hydroxide or potassium hydroxide.

4. An ink composition as claimed in claim 1 in which the binder is selected from the group consisting of ethyl cellulose, ethylhydroxyethyl cellulose, hydroxypropyl cellulose, hydroxypropyl methyl cellulose, polyvinyl alcohol, polyvinyl formal, polyvinyl butyral, polyvinyl acetate, and polyvinyl pyrrolidone.

5. An ink composition as claimed in claim 1 in which the solvent contains 80% by weight or more based on the total weight of the solvent of a monohydric alcohol, having a total of 3 to 6 carbon atoms.

6. An ink composition as claimed in claim 1 in which the solvent contains a monohydric alcohol having a total of 3 to 6 carbon atoms, and a secondary solvent selected from the group consisting of butyl acelate, isopropyl acetate, toluene, xylene, and methyl isobutyl ketone in a quantity of a total of 80% by weight or more based on the total weight of the solvent.

7. An ink composition as claimed in claim 6 in which the ratio of the monohydric alcohol to the secondary solvent component used is 2/8 to 4/6 on a weight basis.

8. An ink composition as claimed in claim 1, which composition further comprises a conventional quantity of a conventional additive selected from the group consisting of plasticizers, stabilizers, waxes, greases, drying agents, hardening agents, emulsifiers, dispersants, and non-sublimable pigments and dyes.

9. An ink composition according to claim 1 wherein said carbinol base derivative is selected from the group of compounds of the formula:

Dy—O—R wherein:

Dy is a cationic moiety of a basic dye;

R is selected from the group consisting of an alkyl group having from 1 to 4 carbon atoms, a benzyl group and a phenyl group.

* * * * *

UNITED STATES PATENT AND TRADEMARK OFFICE
CERTIFICATE OF CORRECTION

PATENT NO. : 4,272,292
DATED : June 9, 1981
INVENTOR(S) : Shogo Mizuno, et al.

It is certified that error appears in the above—identified patent and that said Letters Patent is hereby corrected as shown below:

Col. 2, line 56, after "$Dy^+X^-$" insert -- + --.

Col. 2, line 58, change "NAX" to --NaX--.

Col. 6, line 19, change "transfers ability" to --transferability--

Col. 7, line 65, change "compositions" to --composition--.

Col. 10, line 50, change "do" to --does--.

Col. 12, line 24, after "(48055)" insert -- ) --.

Col. 13, line 13, change "and" to --was--.

Col. 19, line 29, after "for" delete "b".

Table 2, under "Sodium hydroxide" change "O" to numerical --0--.

Col. 22, line 23, correct spelling of "acetate".

Signed and Sealed this

Twenty-second Day of September 1981

[SEAL]

Attest:

GERALD J. MOSSINGHOFF

Attesting Officer        Commissioner of Patents and Trademarks